(No Model.)
L. G. WOOLLEY.
ELECTRIC MOTOR.
No. 325,641. Patented Sept. 1, 1885.
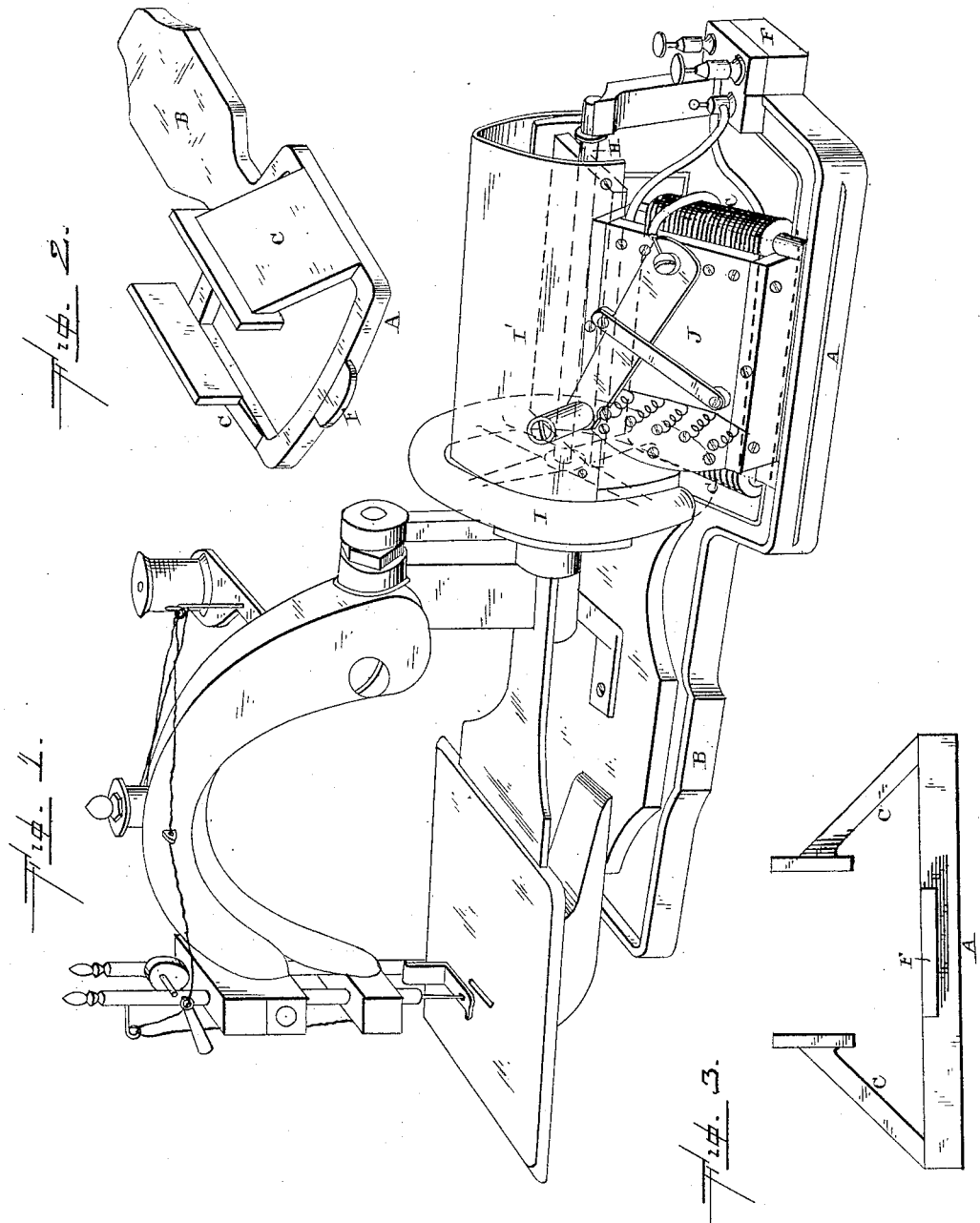
WITNESSES
Louis K. Gardner
J. W. Garner
INVENTOR.
L. G. Woolley,
per F. A. Lehmann,
Attorney

UNITED STATES PATENT OFFICE.

LEONIDAS G. WOOLLEY, OF KALAMAZOO, MICHIGAN.

ELECTRIC MOTOR.

SPECIFICATION forming part of Letters Patent No. 325,641, dated September 1, 1885.

Application filed October 27, 1884. (No model.)

*To all whom it may concern:*

Be it known that I, LEONIDAS G. WOOLLEY, of Kalamazoo, in the county of Kalamazoo and State of Michigan, have invented certain new and useful Improvements in Electric Motors; and I do hereby declare the following to be a full, clear, and exact description of the invention, such as will enable others skilled in the art to which it pertains to make and use it, reference being had to the accompanying drawings, which form part of this specification.

My invention relates to an improvement in electric motors intended especially for sewing-machines; and it consists, first, in a frame which forms a portion of the magnet and which has an extension upon one side for the purpose of resting under the head of the sewing-machine, the object of this part of my invention being to form the frame as a portion of the magnet, and to have the head of the sewing-machine hold the magnet rigidly in position, so that it is impossible for it to move or to become displaced; second, in the combination of the operating shaft of the sewing-machine with the armature, which is applied directly to the shaft or to the balance-wheel upon the shaft, the object of this part of my invention being to secure the armature directly to the shaft or balance-wheel of the sewing-machine, and thus support it in position without having to form journals or bearings therefor upon the magnet, and thus save the use of bolts, gears, and other attachments used in operating the sewing-machine; third, in a magnet having an open base or frame and having the poles of the magnet formed as a part thereof, and inclined upward at a suitable angle toward each other, the object of this part of my invention being to make as long a magnet as possible without taking up unnecessary room, and to make the poles of magnet as long as possible without increasing their height.

Figure 1 is a perspective of a sewing-machine, showing my motor applied thereto. Fig. 2 is a perspective of the combined magnet and frame or base. Fig. 3 is an end view of the same.

A represents the base or frame of the magnet, and which has an extension, B, formed upon one side, as shown. This extension may either be given the shape here shown or any other which may be preferred, and which is made sufficiently long and wide to form a solid bearing for the head of the sewing-machine to rest upon. The head of the sewing-machine resting upon this extension holds the magnet rigidly in place, so that it cannot become readily displaced and thus move the poles of the magnet out of line with the armature. The central portion of the base of the magnet is cut away, as shown, so as to make as long a magnet as possible, and upon the top of this frame are formed the two limbs C of the magnet. These limbs are inclined toward each other at their upper ends, for the purpose of making the limbs as long as possible without adding to their height. By making the limbs as long as possible a greater amount of wire can be wrapped upon them, and thus the strength of the magnet proportionately increased.

Upon the outer side of the frame of the magnet is formed a suitable bracket or extension, F, upon which the commutator is to be placed.

The armature, which will be of any suitable construction, is to be secured directly to the operating-shaft H of the sewing-machine or to the balance-wheel I, as may be most convenient. Where it is possible to run the shaft of the machine directly through the armature, it will be preferable to do so; but where this cannot be done the armature will be attached to the outer side of the balance-wheel. This armature then revolves between the two poles of the magnet and communicates motion both to the shaft which operates the feed of the machine and the needle-bar. I do not limit myself to any particular construction of the sewing-machine, for this motor is easily adapted to any now in use.

In order to prevent the fingers from coming in contact with the armature while in motion, a suitable shield or guard, I', will be placed over the armature in any suitable manner. Connected to the poles of the magnet will be suitable wires, which connect with the rheostat J, which will be of any suitable construction. By moving the pivoted lever the resistance to the current can be increased or diminished at will, according to the required speed. The rheostat can be placed in any desired position upon the machine.

The magnet and its frame being rigidly secured to the head of the sewing-machine, the machine is made perfectly portable and can be set either upon the table, in the lap, upon the arm of an easy-chair, or in any other position that may be desired. The motor adds but very little to the weight of the sewing-machine, and dispenses entirely with the bolts, gears, and other parts which have heretofore been used in operating the sewing-machine.

Having thus described my invention, I claim—

1. In an electric motor, the base of the frame of the magnet, having an extension upon one side as a means of attachment to the head of the sewing or other machine, substantially as shown.

2. In an electric motor, the body or frame of the magnet, provided with the extension B, and having its central portion cut away, and having the limbs of the magnet inclined toward each other, substantially as specified.

3. In an electric motor for sewing-machines, the combination of the operating-shaft or balance-wheel of the machine to be driven, with the armature, which is attached directly to the shaft or balance-wheel, and the magnet, provided with an extension, B, upon one end, substantially as set forth.

4. The combination of the magnet A, having its limbs C inclined toward each other, with the operating-shaft or fly-wheel of the machine to be driven, the armature, which is connected directly to the shaft or wheel, and a rheostat for controlling the speed, substantially as specified.

In testimony whereof I affix my signature in presence of two witnesses.

LEONIDAS G. WOOLLEY.

Witnesses:
HARRY C. ROBERTS,
RICHARD HUNCHEON.